Oct. 16, 1962 G. VARLONGA 3,058,264
SUPPORTING STRUCTURE FOR BUILDINGS
Filed Jan. 30, 1958 3 Sheets-Sheet 1

INVENTOR.
GIOVANNI VARLONGA
BY
Bacon & Thomas
ATTORNEYS

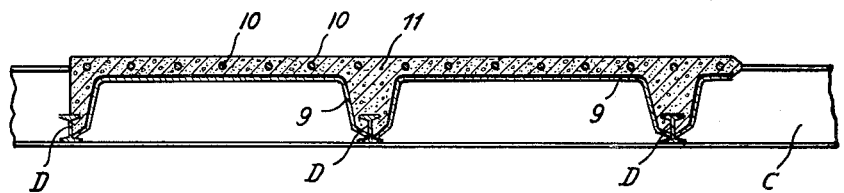
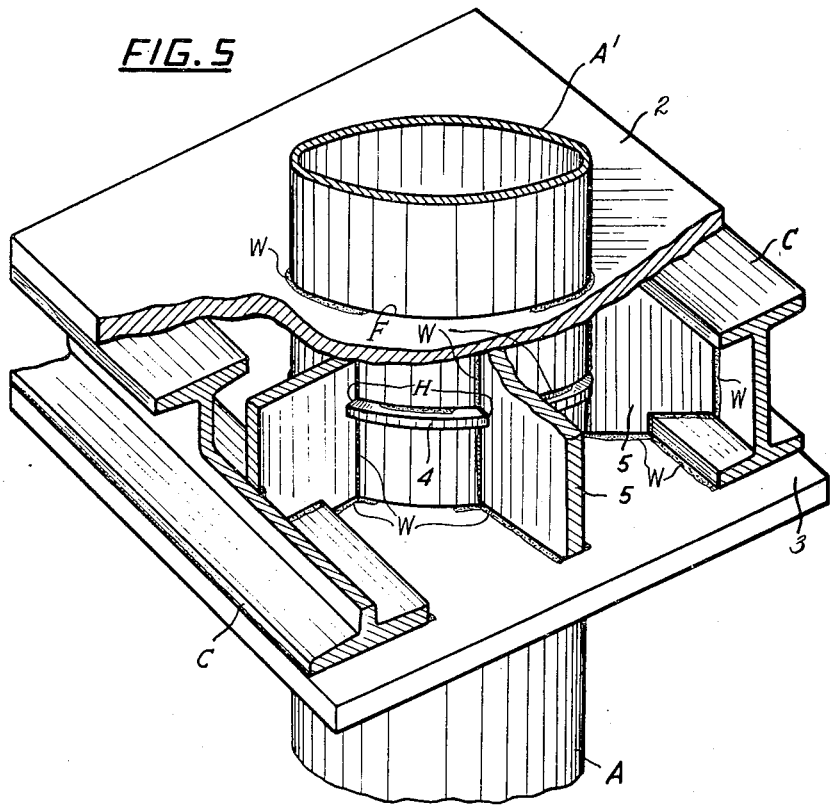

United States Patent Office 3,058,264
Patented Oct. 16, 1962

3,058,264
SUPPORTING STRUCTURE FOR BUILDINGS
Giovanni Varionga, Via Sile 8, Milan, Italy
Filed Jan. 30, 1958, Ser. No. 712,147
6 Claims. (Cl. 50—140)

The present invention relates to supporting structure for multi-story buildings and in particular to improvements in joint structure for use in rigidly connecting a plurality of vertical tubular column members in spaced, axially-aligned relationship and for supporting horizontal beam members in parallel relationship on opposite sides of the joint.

The structure of the present invention includes a plurality of vertical, tubular, metal columns arranged in parallel, longitudinal rows with unitary joints interconnecting the superimposed column members of each column and with horizontal I-beam members supported in parallel relation on the joints at opposite sides of the columns connecting the columns to each other in parallel rows. Secondary beams extend transversely of the parallel I-beam members with perimetral beams connected to the outer ends of the I-beam members and the secondary beams.

It is an object of the present invention to provide a unitary joint for buildings which permits access to the outer surface of the ends of column members disposed therein.

Another object is to provide a unitary joint for tubular columns which permits open communication between column members.

Another object is to provide a unitary joint which is adapted to be quickly and rigidly attached to the ends of superimposed column members.

Another object is to provide a unitary joint which is complementary in configuration to the configuration of beams attached thereto.

Another object is to provide a unitary joint which is simple in structure, readily fabricated from conventional material and economical to manufacture.

These and other objects and advantages of the invention will become more apparent when taken with the following specification, claims and drawings, in which:

FIG. 4 is a fragmentary, sectional view of reinforced concrete flooring incorporated in the structure of FIG. 1; and FIG. 5 is an enlarged fragmentary perspective view of the joint of FIG. 1.

Figure 1:
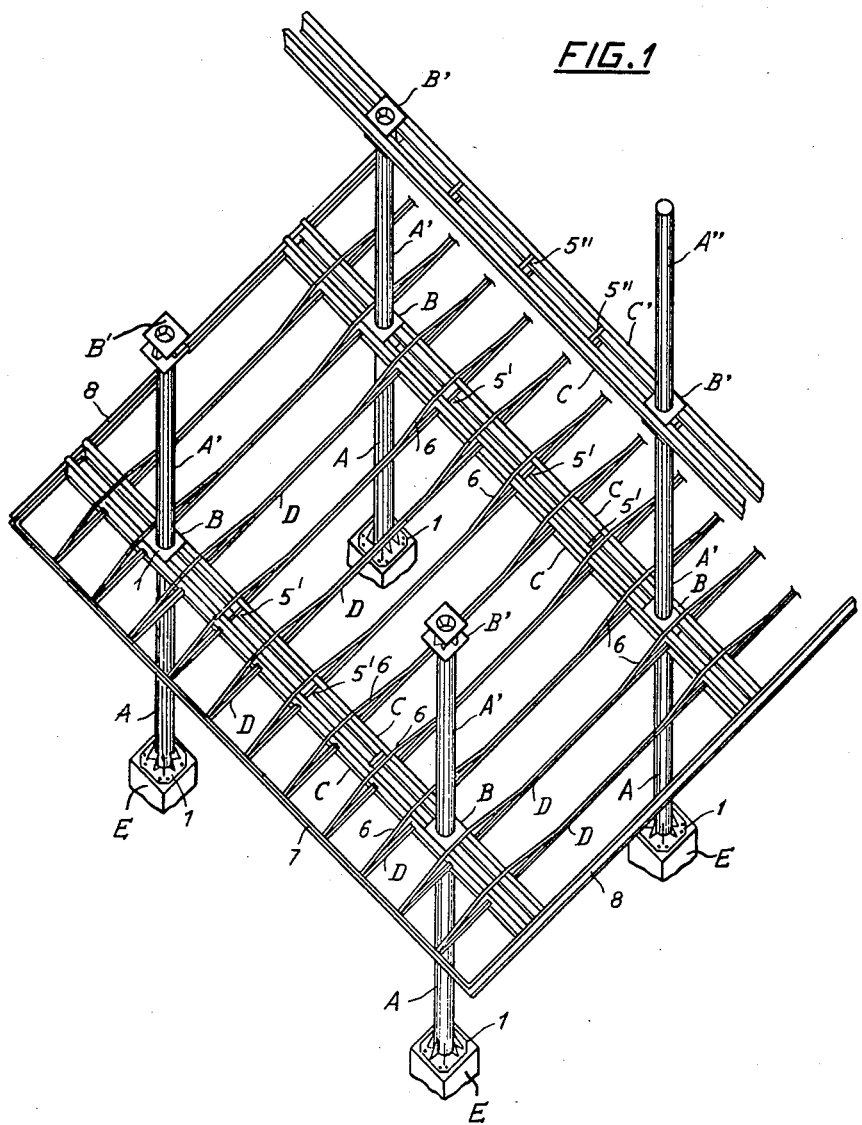
FIG. 1 is a perspective view of a portion of a metal structure according to the invention.

Referring now to the drawings, the first tier of tubular column members A, which form the first story of a multi-story structure, are arranged in parallel, longitudinal rows and rest upon ribbed metal plates 1 which are welded to the lower end of columns A. Plates 1 are supported on and fixedly secured to foundation plinths E. The upper end of each column member A is housed in a unitary metal joint B. Each joint B includes a pair of parallel, spaced, quadrangular plates 2 and 3 having centrally disposed and axially aligned openings F therein. An annular stop element or ring 4, having a diameter at least as large and preferably slightly larger than the opening in plates 2 and 3 and having an opening G therein smaller in diameter than the opening in the plates, is positioned intermediate plates 2 and 3 in alignment with the openings in the plates. A plurality of fins or ribs 5, are disposed between the plates 2 and 3 and extend radially outwardly of the plate openings F and of the stop element 4. The inner edge of fins 5 may be recessed as at H in order to receive the outer edge of stop element 4 therein. Fins 5 are fixedly secured to the plates 2 and 3 by welds W and constitute the sole means for rigidly connecting and supporting plates 2 and 3 and stop element 4 in spaced relation.

Figure 2:
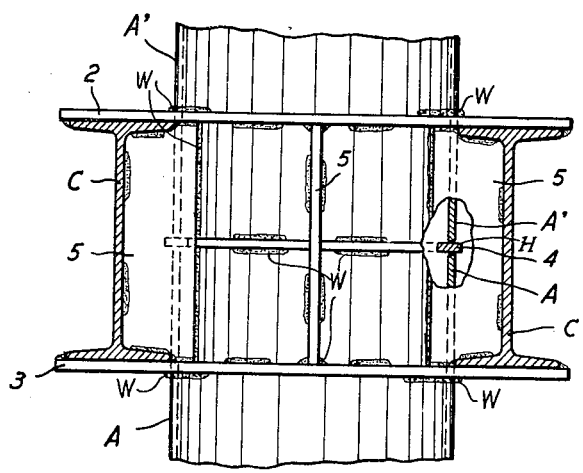
FIG. 2 is an elevational view, partly broken away, of the joint structure of FIG. 1.
Figure 3:
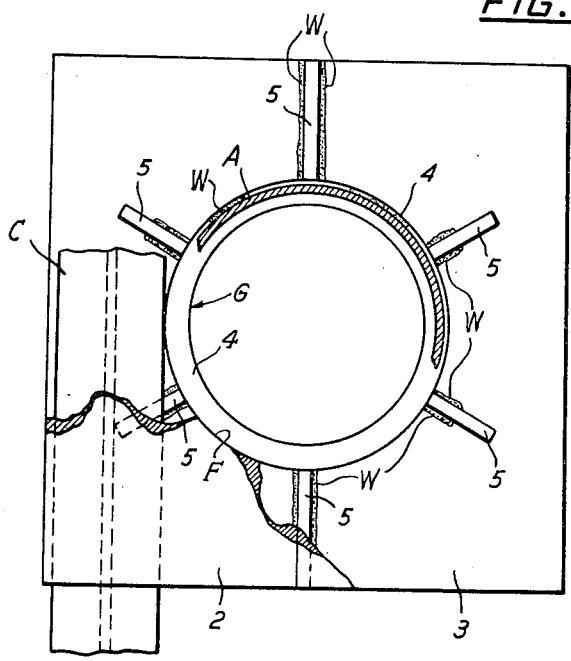
FIG. 3 is a plan view, partly broken away, of the joint structure of FIG. 1.

The upper ends of column members A of the first tier and the lower ends of the column members A' of the second tier are housed within the joints B. The column members rest with their adjacent ends against the stop ring 4 and are rigidly connected to the joints by welding W. As best illustrated in FIGS. 2, 3 and 5, the outer surface of the column members A and A', which are disposed in joint B, are exposed between plates 2 and 3. Thus, the joint may be rigidly secured to the column members A and A' by means of welds W.

The main horizontal structure is formed by metal I-beams C which have a height substantially equal to the distance between the plates 2 and 3 of the joints B. A pair of parallel structural I-beams C extend between the columns in each row and are arranged on opposite sides of each row of columns between the plates 2 and 3 of the joints B. The I-beams C are connected to the plates 2 and 3 and to fins 5 by welding W so as to form a monolithic complex. To this end, the outer edge of a pair of the fins 5 which are disposed on opposite sides of the joints B are profiled so as to be complementary in shape to that of the adjacent face of the adjacent I-beams C. The free portions of the I-beams C, disposed intermediate the joints B, are connected together by a series of cross beams 5' welded thereto.

The upper ends of the column members A' of the second tier and the lower ends of the column members A" are housed within joints B' and secured thereto in the same manner as column members A and A' are secured in joints B. It will be seen that a multi-story building of any desired number of stories may be constructed by connecting superimposed column members together by joints B.

The transversal secondary structure is formed by metal I-beams D, which are smaller than the main I-beams C. I-beams D are arranged in alignment perpendicular to I-beams C with the ends of the I-beams D resting upon the lower flange of the I-beams C and are connected thereto by means of welding. Tie rods 6, which may be formed of metal strip material, connect aligned I-beams D. The tie rods 6 extend over the upper surface of each pair of parallel I-beams C and are rigidly secured by welding to the adjacent ends of aligned I-beams D.

Beams 7 and 8 form the perimetral border of each story of the structure. Beams 7 are welded to the outer ends of exterior I-beams D while beams 8 are welded to the outer ends of I-beams C. Tie rods 6 aid in supporting the exterior I-beams D and beams 7. By providing the perimetral border, the perimetral walls of the building are not interrupted by the columns and can be formed entirely by glassed enclosures.

The above described structure is entirely made with commercial material, without any auxiliary operation except for fabricating the joints B and the rest plates 1, which are prepared on the spot. The assembly of the structure is, therefore, very quickly accomplished and does not require any special equipment. The horizontal structure formed by the beams C and D and the tie rods 6, further provides the main load bearing reinforcing for a concrete floor and has sufficient strength to support the concrete without requiring auxiliary support structures.

For casting the floors, special metal molds 9, each having a plate with opposite borders bent square and resting on the lower flange of the beams D, are used. On top of the molds a metal net 10 is laid, for example, a net having its cross wires welded together, or common reinforcing metal bars. The concrete 11 is then cast until it covers the metal net 10, tie rods 6 and the I-beams C and D. By employing the molds 9 as illustrated in FIG. 4, concrete beams reinforced by I-beams D are provided.

By using, for instance, for the I-beams C a 240 mm. high profile, an 80 mm. profile for the I-beams D and 3 to 4 mm. diam. wire with a 150 to 200 mm. mesh, a floor can be formed which, after removing the molds, can support a load of 700 kgs./m.²

In practice, the details of the invention may vary without leaving the ambit of the invention and, therefore, of the domain of the Letters Patent.

I claim:

1. A joint for use in rigidly connecting a plurality of vertical tubular column members in spaced, axially-aligned relationship, and for supporting horizontal beam members on opposite sides of the column members in a multi-storied building comprising: a unitary member formed of a pair of spaced plates having centrally disposed and axially aligned openings therein for receiving vertical column member ends, the opposed inner surfaces of said plates, on opposite sides of said openings, defining land portions for supporting therebetween horizontal beam members in parallel relationship; a stop element positioned intermediate said plates and aligned with openings in said plates, said stop element presenting abutting surfaces for said tubular column member ends; and a plurality of connecting fins, disposed between said plates, and extending radially outwardly of said plate openings and of said stop element, said fins being integrally joined to said plates and to said stop element and constituting the sole means rigidly connecting and supporting said plates and said stop element in spaced relation, the space between said plates being unobstructed except for said stop element and said fins, thus permitting access to the inner edge of said fins from between said plates and to the outer surface of said tubular column member ends when positioned in said joint.

2. The joint of claim 1 wherein said plate surfaces forming said land portions of said joint are spaced apart a distance sufficient only to receive the horizontal beam members therebetween, at least one of said fins being disposed on each of said opposite sides and having an outer edge formed complementary in shape to that of the inner face of the beam member adapted to be supported adjacent thereto for effecting abutting engagement with said face when said beam member is supported on said joint.

3. The joint of claim 1 wherein said stop element is in the form of an annular ring having a centrally disposed opening therein smaller than said openings in said plates and axially aligned with said plate openings, said opening in said stop ring providing open communication between the interior of superimposed column members when disposed in abutment against said ring.

4. Supporting structure for a multi-story building comprising: a plurality of vertical tubular columns arranged in parallel, longitudinal rows, each of said columns comprising: superimposed column members, each column member having a length corresponding to the height between stories; unitary joints interconnecting the superimposed column members of each of said columns, each of said joints including a pair of vertically spaced plates having centrally disposed and axially aligned openings therein, the opposed inner surfaces of said plates, on opposite sides of said columns, defining land portions for supporting therebetween horizontal beam members in parallel relationship on opposite sides of said columns; a stop element positioned intermediate said plates and aligned with said openings in said plates; a plurality of connecting fins, disposed between said plates and extending radially outwardly of said plate openings and of said stop element, said fins being integrally jointed to said plates and to said stop element rigidly connecting and supporting said plates and said stop element in spaced relation, the space between said plates being unobstructed except for said stop element and said fins thereby permitting access to the inner edge of said fins from between said plates, the adjacent ends of said superimposed column members being disposed in said aligned openings and in abutment against said stop element; and means fixedly securing said ends of said column members to said plates, to the inner edge of said fins and to said stop element.

5. The structure of claim 4 wherein horizontal beam members extend between the columns in each of said rows and are supported in parallel relation between said land portions on said opposite sides of each row of columns, the spacing between said land portions corresponding substantially to the height of said beam members, at least one of said fins being disposed on each of said opposite sides and having an outer edge formed complementary in shape to that of the adjacent face of the adjacent beam member, said edge of each of said fins abutting the said adjacent face of said adjacent beam member; and means fixedly securing said beam members to said plates and to said edges of said abutting fins.

6. The structure of claim 4 wherein said stop element is in the form of an annular ring formed with a centrally disposed opening therein smaller than said openings in said plates and axially aligned with said plate openings, the interior of said superimposed column members of each column being in open communication with each other through said openings in said stop rings.

References Cited in the file of this patent

UNITED STATES PATENTS

| | | |
|---|---|---|
| 485,870 | Larimer | Nov. 8, 1892 |
| 610,984 | Foveaux | Sept. 20, 1898 |
| 880,285 | Eberhard | Feb. 25, 1908 |
| 918,699 | Ransome | Apr. 20, 1909 |
| 976,182 | Jones | Nov. 22, 1910 |
| 1,024,615 | Brown | Apr. 30, 1912 |
| 1,083,120 | May | Dec. 30, 1913 |
| 1,133,658 | Norcross | Mar. 30, 1915 |
| 1,185,207 | Lally | May 30, 1916 |
| 1,571,091 | Lally | Jan. 26, 1926 |
| 1,883,376 | Hilpert et al. | Oct. 18, 1932 |
| 1,973,741 | Bauer | Sept. 18, 1934 |
| 1,982,343 | Kane | Nov. 27, 1934 |
| 2,469,455 | Donahue et al. | May 10, 1949 |
| 2,675,895 | Loewenstein | Apr. 20, 1954 |

FOREIGN PATENTS

| | | |
|---|---|---|
| 715,672 | France | 1931 |
| 862,496 | Germany | 1953 |